UNITED STATES PATENT OFFICE 2,541,137

SILOXANE ELASTOMERS

Earl L. Warrick, Pittsburgh, Pa., assignor to Dow Corning Corporation, Midland, Mich., a corporation of Michigan No Drawing. Application April 7, 1949, Serial No. 86,110

4 Claims. (Cl. 260—37)

The present invention relates to the art of silicone rubbers.

Heretofore silicone rubbers have been described in the literature and have been available commercially. These rubbers have properties which were never previously obtainable with any other material. For example, they retain their elastomeric properties permanently over a temperature range extending from −100° C. to 175° C. No other known rubber will do this. Whereas natural and synthetic organic rubbers have been made which are resilient at low temperature such materials are usually pastes at room temperature. Natural and synthetic organic rubbers deteriorated rapidly at temperatures of 150° C. and are therefore not usable at such temperatures.

The stress strain efficiency of heretofore known silicone rubbers has been in the range from about 50 to 75, the former figure predominating. The stress strain efficiency is computed as the tensile strength of the rubber in pounds per square inch times the per cent elongation at break divided by 1000. Because of these low efficiencies, the heretofore known silicone rubbers are customarily not recommended for use in the temperature range of 0° to 100° C. Within this range the stress strain properties of natural rubber are much higher. It is obviously desirable to produce a siloxane elastomer which will possess at least the same degree of thermal stability and chemical inertness as do the previously known silicone rubbers and at the same time have a much higher order of stress strain efficiency. Such a material makes possible the application of elastomeric materials for uses not applicable with any previously known rubber either organic or siloxane.

It is known that the stress strain efficiency of vulcanized natural rubber is substantially increased by incorporating therein a reenforcing filler such as carbon black. For several years attempts have been made to obtain a similar filler reenforcement in organosiloxane rubbers. Carbon black does not give such a reenforcement in silicone rubbers. Previous attempts to employ silica fillers have as in the case of carbon black produced siloxane elastomers having stress strain efficiencies of below 75. This efficiency is the best obtained with fillers such as $TiO_2$, ZnO and other heavy metal oxides.

It is an object of this invention to produce a diorganosiloxane elastomer having a stress strain efficiency above 150 and which retains this efficiency permanently over a temperature range of from below −60° C. to above 150° C. Other objects and advantages will be apparent from the following description.

In accordance with the present invention a limited group of benzene soluble diorganopolysiloxanes are compounded with a specialized silica filler in amount from 20 to 50 parts by weight filler per 100 parts by weight of siloxane and from 1.5 to 6 parts by weight of a vulcanizing agent selected from the group benzoyl peroxide and tertiary butyl perbenzoate. The compounded material is vulcanized by heating at a temperature above 110° C. until a cured elastomer is obtained.

The diorganopolysiloxane is one in which the siloxane units consist of units of the structural formula $R_2SiO$ where R is a radical of the group methyl, phenyl or siliconeopentyl $$[(CH_3)_3SiCH_2-]$$

radicals. At least 90% of the total number of R groups are methyl radicals. The polysiloxane may be one in which all of the siloxane units are $(CH_3)_2SiO$ or the siloxane may be a copolymer of dimethylsiloxane and a minor amount of any combination of the following units:

$C_6H_5(CH_3)SiO$, $(C_6H_5)_2SiO$,
$[(CH_3)_3SiCH_2]CH_3SiO$,
$[(CH_3)_3SiCH_2]C_6H_5SiO$
and $[(CH_3)_3SiCH_2]_2SiO$ All polysiloxanes of the above type do not produce the improved elastomers of this invention. In order for the advantages of the present invention to be obtained, the polymer employed must be one which has a viscosity sufficient that the penetrometer reading is less than 380 (expressed in units of tenths of millimeters) after 10 seconds at 25° C., as determined in accordance with ASTM, D-217-44T. The viscosity of these materials is so high that as a practical matter it is impossible to determine the fluid viscosity in cs. Such polymers have little or no flow at room temperature and are soft solids which may or may not be tacky and which possess little or no elastic recovery when stretched. In appearance these materials are similar to the insoluble SiOSi crosslinked gels or gums from which silicone rubber has heretofore been made. The polysiloxanes used in accordance herewith differ from those gels or gums in that they are completely soluble in benzene and in that they produce, when employed in the present process, high efficiency rubbers which are not produceable from the insoluble silicone gels or gums.

Polymers of the defined type may be prepared by any appropriate method. Appropriate methods include catalytical polymerization and copolymerization of organo-siloxanes. Catalysts for such polymerizations are known in the art and include such materials as sulfuric acid, fuming sulfuric acid, alkali metal hydroxides, alkali metal salts of organosilanols. In addition to these, it has been found that the heretofore unemployed alkali metal alcoholates or complexes of alkali metal hydroxides and an alcohol [(ROH)$_x$·MOH] are of particular utility in the polymerization of the siloxanes. These complexes are made by mixing the alcohol and alkali metal hydroxide, and boiling off the excess alcohol and the water, whereupon the solid powdery complex is obtained. It is preferred that the polymerization be carried out under substantially anhydrous conditions. When either an alkali metal ethylate or propylate or a complex of alkali metal hydroxide and ethyl or propyl alcohol is employed, it is preferred to employ the catalyst in amount of one atom of alkali metal per two thousand to twenty-three thousand silicon atoms.

The finely divided silica which is employed in accordance herewith is a very specialized material. It is one which has a pore volume of at least 4 cc. per gram of filler and a heat of wetting of from 0.3 to 1.0 calory per cc. of pore volume. This pore volume is the value determined by placing a weighed sample of the silica filler in a pycnometer, filling the pycnometer with water and determining the ccs. of water present by difference in weight. The pycnometer is then recharged with another weighed sample of the filler and the pycnometer is filled with mercury. The volume of mercury is likewise determined. The volume of water in ccs. minus the volume of mercury in ccs. gives the pore volume in ccs. This may be converted to ccs. of pore volume per gram based upon the weight of the sample employed. The heat of wetting is determined by placing a weighed sample of water in a calorimeter. A weighed sample of the silica filler, having the same temperature as the water in the calorimeter, is then added to the water and the temperature rise, which is noted, converted to the heat of wetting by the formula $$H_w = \frac{\Delta T}{W_s}(H + H_1 \times W_1 + 0.188 W_s)$$

where $H_w$ is the heat of wetting in calories per gram, $\Delta T$ is the temperature rise in degrees centigrade, $W_s$ is the weight of silica. $H$ is the calorimeter constant, $H_1$ is the specific heat of the water and $W_1$ the weight of the water. The constant 0.188 is the specific heat of quartz. The heat of wetting so determined, is in calories per gram. The critical value with respect to the present invention is calories per cc. of pore volume. Accordingly, the calories per gram may be divided by the pore volume in cc. per gram to obtain the desired heat of wetting in calories per cc. of pore volume.

The fillers may be produced by any of various processes. Thus, some silica aerogels have the pore volume and heat of wetting defined and are suitable whereas others do not correspond to the standards defined and produce a silicone rubber characteristically like those described in the art which have efficiencies in the range below 75. Likewise, silicas are producible by known fuming processes which have the pore volume and heat of wetting defined and which are suitable for the present invention. In general it can be said that the dense silicas such as sand and the dried hydro-gels are not suitable. Some diatomaceous earths have proper pore volume but due to inadequate heat of wetting, are not suitable for the present purposes. If desired, the surface of such a diatomaceous earth may be modified to increase the heat of wetting and thereby produce a silica suitable for the present invention.

The filler is employed in amount between 20 to 50 parts by weight per 100 parts by weight of the siloxane. If the filler is employed in amounts above or below this range the elastomers obtained do not have efficiencies of the same order as those of this invention. When the filler and the siloxane are compounded in the particular amounts shown above, the compounded material becomes tough and leathery. In some cases the tensile strength and elongation of this compounded unvulcanized material are higher than those of previously known vulcanized siloxane elastomers. The marked increase in the toughness of the compounded unvulcanized materials is not observed when fillers other than those defined are used or when the siloxane polymer does not respond to those defined herein. When liquid siloxanes previously employed to make siloxane elastomers are mixed with a filler, only thin pastes which are unchanged upon standing are obtained. When insoluble siloxane gels or gums are compounded with a filler the product is a stiff material which before vulcanization has tensile strength and elongation too low to be measured by the ordinary method. The toughening of the herein defined siloxane polymers upon addition of a filler is probably due to the reinforcing action peculiar to the fillers employed in this invention.

As above indicated, the vulcanizing agents which are employed are benzoyl peroxide and tertiary butyl perbenzoate. Either of these or a combination of the two is employed in amount from 1.5 to 6 parts by weight per 100 parts by weight of siloxane. In amounts below 1.5 parts, vulcanization is too slow to be practical. In amounts above 6 parts, inferior products are produced.

The polysiloxane and filler may be compounded in any convenient method. One method is to give a preliminary mix in a dough mixer followed by milling. It is preferred to add the silica to the polysiloxane in proportions of less than ⅓ of the total amount of filler at any one time. Thorough mixing should be given after each addition to assure adequate dispersion of the filler and thorough wetting of the filler by the polymer. The peroxide may be added either with the filler or after addition of the filler is complete.

The compounded siloxane is vulcanized by heating it at a temperature above 110° C. for at least 3 minutes. Additional curing either in the vulcanizing press or an oven may be employed. The temperature should be below that at which destructive distillation of the siloxane takes place. Vulcanization temperatures employed are generally within the range of 110° to 250° C. If desired, the vulcanized products may be held in an oven at any desired temperature up to 250° C. for several hours to deodorize the product and to adjust the specific physical properties relatively. Such a cure may be employed to improve the compression set and Shore hardness.

The elastomers of this invention are coherent, non-tacky rubbery materials having tensile strengths upwards of 500 pounds per square inch and elongations upwards of 300% at break. This means that the efficiencies of the products are at least 150 which is double those of the known silicone rubbers. These elastomers show an unusually high resistance to solvent and are stable at temperatures ranging from below —60° C. to 250° C.

The radical improvement in mechanical properties in these siloxane elastomers over those previously known may be due at least in part to a reenforcing action by the particular silica fillers employed though it is to be noted that these silica fillers have this action only in connection with the particular type siloxane polymers described.

The present elastomers are of utility in a wide variety of applications such as for the insulation of electrical equipment and for the production of commercial items such as tubing, hoses, sheeting and the like either by molding or extrusion. In addition, the compounded polysiloxanes described herein are particularly useful for the water-proofing of fabrics. This may be done by applying the compounded siloxane to the fabric and thereafter vulcanizing the siloxane by heating the coated fabric at a temperature above 110° C. The compounded siloxane may be conveniently applied to the fabric in the form of a solution.

Limited amounts of other additives such as pigments and the oxides of iron, mercury and other heavy metals may be incorporated in the elastomers of this invention in order to impart the desired color or to improve a specific property such as compression set.

In order that this invention may be better understood, recourse may be had to the following examples which should be considered as illustrative only.

EXAMPLE 1

1000 grams of octamethylcyclotetrasiloxane was placed in a flask and heated to 165° C. The tetramer was stirred as 0.14 gram of a potassium hydroxide-isopropanol complex

$[((CH_3)_2CHOH)_x \cdot KOH]$ was added in amount of 1 K atom per 4470 silicon atoms. Heating and agitation were continued for 25 minutes whereupon the polymer was poured into a dish and heated an additional 3 hours at 150° C. When cooled, the polymer was completely soluble in benzene and had a penetrometer reading of 190 in 30 seconds at 25° C.

The dimethylpolysiloxane was mixed with 35 parts by weight of a silica filler having a pore volume of 5.66 ccs. per gram and a heat of wetting of 0.74 calory per cc. of pore volume. The mixture was milled on a 2 roll mill as 4 parts by weight based upon the weight of the siloxane of tertiary butyl perbenzoate was added. The milled compound was vulcanized by heating in a press at 150° C. for 5 minutes. As molded, the tensile strength was 1203 pounds per square inch, the elongation at break was 700 per cent and the efficiency was 842.

EXAMPLE 2

A series of runs was made in order to determine the effect of the amount of filler. The copolymer employed was prepared by polymerizing mixed cyclic dimethylsiloxanes by heating with a potassium hydroxide-isopropanol complex in amount of 1 potassium atom per 4470 silicon atoms. The polymerization was carried out at 165° C. and heating was continued until the polymer became too viscous to stir. The polymer was then poured into a dish and allowed to cool. The material was completely soluble in benzene and had a penetrometer reading of less than 380 in 10 seconds at 25° C.

This polymer was compounded with various amounts of silica filler as shown in Table I below. The silica filler employed in each case had a pore volume of 5.66 ccs. per gram and a heat of wetting of 0.74 calory per cc. of pore volume. In each case, 4 parts by weight of terbutyl perbenzoate based upon the weight of the siloxane was used as a vulcanizing agent. Each mixture was vulcanized by heating at 150° C. in a press for 5 minutes. The results with various amounts of the filler are shown in the table below.

Table I

| Parts by weight filler per 100 parts siloxane | Tensile in p. s. i. | Per cent Elongation at break | Efficiency |
|---|---|---|---|
| 10 | 220 | 125 | 27 |
| 25 | 624 | 414 | 259 |
| 35 | 855 | 293 | 251 |
| 50 | 735 | 215 | 158 |

When the amount of filler employed is above 50 parts by weight, the tensile and elongation of the vulcanized elastomer are very low.

EXAMPLE 3

The effect of polymer size, as shown by penetrometer readings, and the type of polymer is illustrated by this example.

A series of benzene soluble dimethylsiloxane polymers was prepared by polymerizing cyclic dimethylsiloxane with a potassium hydroxide-isopropanol complex. In each case the complex was employed in amount of 1 potassium atom per 5000 silicon atoms and the mixture was heated and agitated until the desired degree of polymerization was obtained. In this manner three polymers having penetrometer readings of above 380 in 10 seconds at 25° C., 380 in 10 seconds at 25° C. and 231 in 30 seconds at 25° C., respectively, were prepared. Each of these polymers was mixed with 25 parts by weight of silica filler having a pore volume of 9.77 ccs. per gram and a heat of wetting of 0.72 calory per cc. of pore volume. Each mixture was milled with 4 parts by weight tertiary butyl perbenzoate and the milled materials were each polymerized by heating in a press at 150° C. for 5 minutes.

For comparison cyclic dimethylsiloxane was polymerized to a gel insoluble in benzene by heating it in the presence of aqueous KOH in a ratio of one potassium atom per 500 silicon atoms at a temperature of 165° C. The gel was compounded with 25 parts by weight of the above defined silica filler and 4 parts by weight ter-butyl perbenzoate and vulcanized by heating at 150° C. for 5 minutes.

The results of the various runs are shown in Table II below:

Table II

| Penetrometer readings in tenths of a mm. at 25° C. | Soluble in Benzene | Tensile in p. s. i. | Percent Elongation at break | Efficiency |
|---|---|---|---|---|
| Above 380 in 10 sec | yes | 248 | 200 | 50 |
| 380 in 10 seconds | yes | 621 | 395 | 246 |
| 231 in 30 seconds | yes | 1062 | 590 | 602 |
| gel | no | 295 | 110 | 32 |

This table shows that diorganosiloxane polymers which have penetrometer readings above 380 in 10 seconds at 25° C. do not give elastomers having the superior qualities of those of this invention. The results obtained with the insoluble gel show that organosiloxane polymers containing SiOSi cross-links do not produce elastomers comparable with those of this invention.

EXAMPLE 4

Cyclic dimethylsiloxanes were polymerized to a benzene soluble polymer having a penetrometer reading of less than 380 in 10 seconds at 25° C. The polymerization was carried out in the manner shown in Example 1. This polymer was employed in a series of runs in order to determine the reenforcing action of various silica fillers. The results are shown in Table III below. In each case the polymer was compounded by mixing it with 25 parts by weight filler and 4 parts by weight tertiary butyl perbenzoate. Each of the compounded materials was vulcanized by heating in a press at 150° C. for 5 minutes. The tensiles and elongations shown in the table were those obtained immediately after vulcanization.

*Table III*

| Silica filler | | Tensile in p. s. i. | Percent Elongation at break | Efficiency |
|---|---|---|---|---|
| Pore Volume, cc. per gram | Heat of Wetting, calories per cc. of pore volume | | | |
| 3.04 | 0.153 | 171 | 225 | 38 |
| 7.32 | 0.655 | 448 | 512 | 230 |
| 9.77 | 0.72 | 620 | 395 | 245 |
| 5.66 | 0.74 | 455 | 330 | 150 |
| 2.76 | 1.365 | 120 | 125 | 15 |
| 1.695 | 3.16 | Too weak to measure. | | |

EXAMPLE 5

Octamethylcyclotetrasiloxane was heated to 160° C. and agitated as a potassium hydroxide-isopropanol complex in amount of one potassium atom per 5000 silicon atoms was added. The heating was continued for 25 minutes whereupon the viscous polymer was poured into a dish and allowed to cool. The polymer had a penetrometer reading of less than 380 in 10 seconds at 25° C. and was completely soluble in benzene. The polysiloxane was milled on a 2 roll mill with 30 parts by weight of a silica filler having the pore volume of 7.32 cc. per gram and a heat of wetting of 0.655 calory per cc. of pore volume, and 1.5 parts by weight based upon the weight of the siloxane of benzoyl peroxide. The milled material was vulcanized by heating it in a press at a temperature of 126° C. for 5 minutes. The elastomer thus formed had a tensile strength of 671 pounds per square inch and an elongation of 505 per cent. The efficiency was 339.

EXAMPLE 6

An elastomer was prepared from a copolymer having the composition 93 mol per cent dimethylsiloxane and 7 mol per cent diphenylsiloxane as follows: A mixture of 1000 grams of octamethylcyclotetrasiloxane, 198 grams of octaphenylcyclotetrasiloxane and 108 grams of xylene was heated to 160° C. A potassium hydroxide-isopropanol complex was added in amount of one potassium atom per 5000 silicon atoms. Heating was continued at 160° C. for 4½ hours as xylene was removed. The copolymer was then poured in a dish and allowed to cool. It had a penetrometer reading below 380 in 10 seconds at 25° C. and was completely soluble in benzene.

The copolymer was milled on a 2 roll mill with 30 parts by weight of silica filler and 3 parts by weight based upon the weight of the siloxane of benzoyl peroxide. The silica filler had a pore volume of 7.32 ccs. per gram and a heat of wetting of 0.655 calory per cc. of pore volume. The compounded material was vulcanized by heating it in a press at 126° C. for 5 minutes. The elastomer so prepared had a tensile strength of 509 pounds per square inch, an elongation of 590 per cent and an efficiency of 300.

EXAMPLE 7

A mixture of 1000 grams of octamethylcyclotetrasiloxane and 59.1 grams of phenylmethylsiloxane was heated to 160° C. Potassium hydroxide-isopropanol complex was added in amount of one potassium atom per 5000 silicon atoms. Heating at 160° C. was continued for 23 minutes whereupon the viscous polymer was poured into a dish and allowed to cool. The polymer had a penetrometer reading of 260 in 30 seconds at 25° C. and was completely soluble in benzene. The composition of the copolymer was 97 mol per cent dimethylsiloxane and 3 mol per cent phenylmethylsiloxane.

The copolymer was milled with 30 parts by weight of a silica filler and 3 per cent by weight benzoyl peroxide based upon the weight of the siloxane. The filler had a pore volume of 7.32 ccs. per gram and a heat of wetting of 0.655 calory per cc. of pore volume. The compounded material was vulcanized by heating it in a press at 126° C. for 5 minutes. The resulting elastomer had a tensile strength of 528 pounds per square inch, an elongation of 525 per cent and an efficiency of 275.

EXAMPLE 8

A copolymer having a composition of 87 mol per cent dimethylsiloxane and 13 mol per cent phenylmethylsiloxane was prepared as follows: A mixture of 177 grams of phenylmethylsiloxane and 644 grams of octamethylcyclotetrasiloxane was heated to 160° C. Potassium hydroxide-isopropanol complex was added in amount of one potassium atom per 5000 silicon atoms. Heating at 160° C. was continued for 30 minutes whereupon the viscous copolymer was poured into a dish and allowed to cool. The material had a penetrometer reading of 250 in 30 seconds at 25° C. and was completely soluble in benzene.

The copolymer was milled in a 2 roll mill with 40 parts by weight of a silica filler and 4 parts by weight based on the weight of the siloxane of benzoyl peroxide. The milled material was vulcanized by heating it in a press at 126° C. for 5 minutes. The resulting elastomer had a tensile strength of 513 pounds per square inch, an elongation of 530 per cent and an efficiency of 272.

EXAMPLE 9

A copolymer having the composition 90 mol per cent dimethylsiloxane and 10 mol per cent siliconeopentylmethyl-siloxane was prepared as follows: 597 parts by weight octamethylcyclotetrasiloxane, 109 parts by weight trisiliconeopentyltrimethylcyclotrisiloxane and 28 parts by weight of 30 per cent fuming sulfuric acid, were mixed and allowed to stand at room temperature until a homogeneous non-flowing copolymer was obtained. The copolymer was dissolved in benzene and the solution was washed with water until acid-free. The solvent was then evaporated and the benzene soluble residue had a penetrometer reading of less than 380 in 10 seconds at 25° C.

The copolymer was milled with 25 parts by weight of a silica filler and 4 parts by weight based upon the weight of the siloxane of tertiary butyl perbenzoate. The silica filler had a pore volume of 9.77 cc. per gram and a heat of wetting of 0.72 calory per cc. of pore volume. The milled material was vulcanized by heating it in a press at 150° C. for 10 minutes. The elastomer was removed from the press and heated one week at 200° C. The resulting product had a tensile strength of 530 pounds per square inch, an elongation of 320 per cent and an efficiency of 169.

It is to be understood that in all of the above examples the amount of filler and vulcanizing agent are both expressed in parts by weight per 100 parts by weight of the polysiloxane.

That which is claimed is:

1. A method of preparing a diorganosiloxane elastomer which comprises compounding a benzene soluble diorganopolysiloxane in which the structural units are $R_2SiO$ where R is selected from the group consisting of methyl, phenyl and siliconeopentyl radicals, and in which siloxane at least 90% of the total number of R groups are methyl radicals, said polysiloxane having a penetrometer reading of less than 380 after 10 seconds at 25° C. in accordance with ASTM, D-217-44T, a silica filler in amount from 20 to 50 parts by weight filler per 100 parts by weight polysiloxane, said silica having a pore volume of at least 4 cc. per gram and a heat of wetting by water of from 0.3 to 1.0 calory per cc. of pore volume, and from 1.5 to 6 parts by weight based upon the weight of the siloxane of a vulcanizing agent selected from the group consisting of benzoyl peroxide and tertiary butyl perbenzoate, and heating the compounded material at a temperature above 110° C. until a coherent, non-tacky, rubbery product is obtained.

2. A method of preparing a diorganosiloxane elastometer which comprises vulcanizing a compounded diorganosiloxane by heating it at a temperature above 110° C. until a coherent, non-tacky, rubbery product is obtained, said compounded organosiloxane consisting of a benzene soluble diorganopolysiloxane in which the structural units are $R_2SiO$ where R is selected from the group consisting of methyl, phenyl and siliconeopentyl radicals, and in which diorganosiloxane at least 90% of the total number of R groups are methyl radicals said polysiloxane having a pentrometer reading of less than 380 after 10 seconds at 25° C. in accordance with ASTM, D 217-44T, a silica filler in amount from 20 to 50 parts by weight filler per 100 parts by weight polysiloxane said silica having a pore volume of at least 4 cc. per gram and a heat of wetting by water of from 0.3 to 1.0 calory per cc. of pore volume, and from 1.5 to 6 parts by weight based on the weight of the diorganosiloxane of a vulcanizing agent selected from the group consisting of benzoyl peroxide and tertiary butyl perbenzoate.

3. A composition of matter consisting of a benzene soluble diorganopolysiloxane in which the siloxane units are of the type $R_2SiO$ where R is selected from the group consisting of methyl, phenyl and siliconeopentyl radicals, and in which polysiloxane at least 90% of the R groups are methyl radicals, said polysiloxane having a penetrometer reading of less than 380 after 10 seconds at 25° C. in accordance with ASTM, D-217-44T, a silica filler in amount of from 20 to 50 parts by weight filler per 100 parts by weight polysiloxane, said filler having a pore volume of at least 4 cc. per gram and a heat of wetting by water of from 0.3 to 1.0 calory per cc. of pore volume and from 1.5 to 6 parts by weight based upon the weight of the siloxane of a vulcanizing agent selected from the group consisting of benzoyl peroxide and tertiary butyl perbenzoate.

4. A diorganosiloxane elastomer having an efficiency of at least 150, a tensile strength of at least 500 pounds per square inch and an elongation at break of at least 300%, said elastomer consisting of a diorganopolysiloxane in which the siloxane units are of the type $R_2SiO$ where R is selected from the group consisting of methyl, phenyl and siliconeopentyl radicals, at least 90% of the total number of R groups in the siloxane being methyl radicals and a silica filler in amount from 20 to 50 parts by weight filler per 100 parts by weight siloxane said filler having a pore volume of at least 4 cc. per gram and a heat of wetting by water of from 0.3 to 1.0 calory per cc. of pore volume.

EARL L. WARRICK.

REFERENCES CITED

The following references are of record in the file of this patent:

UNITED STATES PATENTS

| Number | Name | Date |
| --- | --- | --- |
| 2,448,530 | Jones | Sept. 7, 1948 |
| 2,448,556 | Spring et al. | Sept. 7, 1948 |
| 2,460,795 | Warrick | Feb. 1, 1949 |